March 28, 1944.   R. SHIPLEY   2,345,299
CONTROL HEAD COUPLING
Filed Dec. 2, 1942
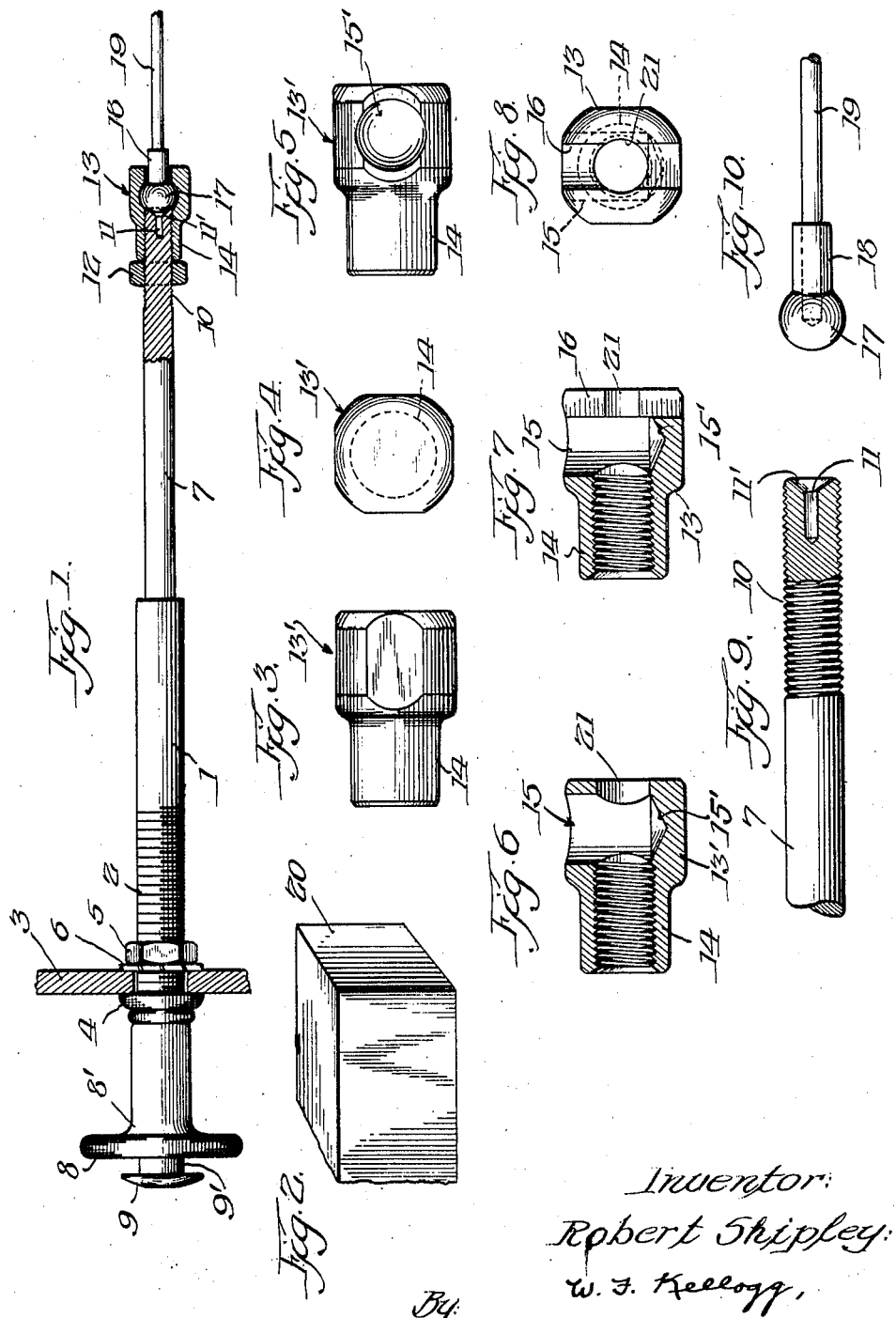
Inventor:
Robert Shipley.
W. F. Kellogg,
By
Atty.

Patented Mar. 28, 1944

2,345,299

UNITED STATES PATENT OFFICE 2,345,299

CONTROL HEAD COUPLING

Robert Shipley, Kalamazoo, Mich., assignor to Shakespeare Products Company, Kalamazoo, Mich., a corporation of Michigan Application December 2, 1942, Serial No. 467,645

4 Claims. (Cl. 287—87)

This invention relates to improvements in control devices, i. e., control devices such as are used in connection with charge forming devices and the like of airplanes and other types of motor driven vehicles, the invention having for an object to provide a novel, practical and constructionally simple form of means for attaching a cable or like connection to a control head whereby said cable will be rendered self-adjustable with relation to the head and thus, insure unimpeded slidable adjustment of the control head and the effectual, faithful and accurate transmittal of operating motion to the cable and to the device or apparatus to be actuated or controlled thereby, as for example, the controls of charge forming devices of automobiles, airplanes, motor boats, etc.

The invention also aims to provide a control device cable coupling end fitting so constructed as to permit convenient, rapid and positive reception and retention of a cable coupling head therein, allowing pivotal or limited universal movement of said coupling head during and throughout its entire period of use; hence, assuring automatic or self relative adjustment of the connected cable in order that operative linear motion will, at all times, be faithfully and accurately transmitted thereby to a device or apparatus operatively connected thereto; moreover, a fitting which, when desired, can be as conveniently and rapidly adjusted to allow disconnection of the coupling head therefrom for purposes of parts inspection, repair, replacement, etc.

Other objects of the invention will be in part obvious and in part pointed out hereinafter.

In order that the invention and its mode of operation may be readily understood by those skilled in the art to which it appertains, I have in the accompanying drawing and the detailed description based thereon, set out one embodiment of my invention.

In the drawing:

Figure 1 is a longitudinal elevation, with parts in section, of my improved control coupling.

Figure 2 is a fragmentary perspective view of a block of material from which the improved coupling fitting may be formed or shaped.

Figure 3 is a side elevation of the improved coupling fitting at its first stage of production.

Figure 4 is an end elevation of the same.

Figure 5 is an elevation similar to that illustrated by Figure 3, wherein the coupling head has been drilled to provide an internal chamber.

Figure 6 is a longitudinal section taken at substantially right angles to Figure 5.

Figure 7 is a like section in which the outer end of the coupling fitting has been milled or sawed to receive the shank of a coupling head therethrough.

Figure 8 is an end elevation of the coupling head illustrated in Figure 7.

Figure 9 is a fragmentary elevation, partly in longitudinal section, showing the formation of the outer end of the lock rod or control head which is adapted to be engaged in or with the coupling fitting in the manner shown in Figure 1; and Figure 10 is a detail and elevation of the type of coupling head employed in connection with the control coupling fitting.

Having more particular reference to the drawing, in connection with which like characters of reference will designate corresponding parts throughout, and referring, especially, to Figure 1 of the accompanying drawing, the type of control mechanism illustratively selected in this particular hereinafter described embodiment of my invention, comprises a body tube 1, of suitable material, length and diameter, externally screw threaded along one of its end portions, as at 2, adapted to be received through an appropriate opening or way formed in a control board 3 and moreover, adapted to be immovably secured or locked with relation to such control board by means of a face plate 4 engaged over the screw threaded inner end portion of the body tube 1 bearing upon an adjacent side portion of said control board 3, and a locking nut 5 turned upon said screw threaded portion 2 of the body tube 1 adjacent the opposite side of said control board 3 and moved into binding engagement with an interpositioned lock washer 6 engaged about the body tube and bearing upon an adjacent portion of the outer side of the control board.

A control head or lock rod 7, of suitable length, is slidably received in and through the body tube 1. The outer end of the control head is provided with a knob 8 equipped with a sleeve-like shank portion 8', the latter having the sleeve-like shank 9' of a button-like element 9 telescopically engaged therewith. The sleeve-like shank 9' is connected, at its inner end, to a latch rod (not shown) cooperatively associated with the control head or lock rod 7 whereby the latter may be releasably locked or secured in predetermined adjusted positions within and with respect to the body tube 1.

The outer end of the control head 7 is externally screw threaded as at 10 and has a co-axially disposed center drilled opening or pocket 11 therein, as well shown in Figures 1 and 9 of the accompanying drawing; it being noted that the outer end of this drilled opening or pocket 11 is chamfered as shown at 11', for a purpose which will be subsequently apparent. A locking nut 12 is turned upon the screw threaded portion 10 of the control head 7 and, obviously, is longitudinally movable therealong.

The improved coupling fitting comprises a body of metal or other suitable material, designated in its entirety by the numeral 13, having an integral and co-axially disposed internally screw threaded sleeve-like shank 14 on one end thereof adapted to receive the externally screw threaded portion 10 of the control head 7 therein and therethrough. A relatively right angularly arranged or disposed and cross sectionally circular chamber 15, having a rounded bottom 15', is provided in the body of the coupling fitting 13. This chamber 15 has communication with the inner end of the sleeve-like shank 14 and opens onto one side of the outer end thereof. The outer end of the coupling fitting is formed with a milled or sawed slot or way 16, which, as will be noted upon reference to Figures 7 and 8 of the accompanying drawing, communicates with the outwardly and sidewardly opening portions of the cross-sectional circular chamber 15.

A ball-shaped or spherical coupling head 17, of appropriate diameter, is movably though comparatively snugly received within the cross-sectionally circular chamber 15 of the fitting 13 and carries an outwardly disposed shank 18 passing through the open outer end of such chamber and the slot or way 16 in order to afford means whereby a flexible cable 19, or the like, may be connected thereto. The cable 19, as will be understood, extends into operative engagement or connection with the device or apparatus (not shown) to be actuated or controlled by the control mechanism, such for example, as the control of a charge forming device or carburetor of an airplane, automobile, motor boat or other motor driven vehicle.

With introduction of the spherical head 17 of the coupling head into the cross-sectionally circular chamber 15 of the fitting 13, the control head 7 is rotated in a direction to cause inward movement of the screw threaded end portion 10 thereof into the adjacent portion of its communicating chamber 15. By such movement or adjustment of the control head 7, it will be noted that the chamfered portion 11' of the opening or pocket 11 formed in the now adjacent end of the control head 7 will be brought into seating or capping like engagement with an adjacent portion of the spherical head 17 of the coupling head. When such engagement has been established, the nut 12 is turned into binding or locking engagement with the adjacent end of the internally screw threaded portion 14 of the fitting 13, thus locking it against further or undesired rotary or turning movement. In consequence, the spherical head 17 of the coupling head will be locked or secured within the chamber 15 against lateral displacement thereof via its open side, but nevertheless, comparatively free pivotal movement of said spherical head and hence, the coupling head, will be permitted whereby to permit relative automatic or self-pivotal adjustment between the connected end of the cable 19 and the inner end of the control head 7. By reason of the engagement of the shank 18 of the coupling head through the milled or sawed slot 16, aforesaid, it will be appreciated that the extent of pivotal movement of the spherical head 17 of the coupling head and the cable 19, with relation to the coupling fitting, will be limited. However, such pivotal movement as is or will be allowed or permitted the coupling head and the cable 19 connected thereto, will be quite sufficient to permit of relative automatic or self-adjustment between the two thus connected elements and too, will insure, through such self or automatic adjustment, efficient, faithful and accurate transmittal of linear motion from the control mechanism (the control head 7) to the flexible cable 19 and the device or apparatus to which the latter is operatively connected.

It will be understood and appreciated that the extent of locking engagement of the chambered inner end of the control head 7 with the spherical head 17 of the coupling head may be adjusted or varied by turning the screw threaded portion 10 of said control head into or from the internally screw threaded sleeve 14 of the coupling fitting 13, thereby moving the same into desired relationship with respect to said spherical head 17. Also, it will be understood that following the attainment of such desired character of engagement, the same may be maintained or retained by bringing the locking nut 12 on said screw threaded portion 10 into binding engagement with the adjacent end of the sleeve 14.

In producing my coupling fitting, I preferably effect the same from square or substantially square bar stock, as fragmentally illustrated in Figure 2 and now identified by the numeral 20. By appropriate and well known machining operation capable of being accomplished upon an automatic screw machine, a coupling fitting blank or body, such as shown in Figures 3 and 4 and identified by the numeral 13', is produced. At this stage of production operation, the coupling fitting body 13' is right angularly drilled, thereby forming the hereinbefore described cross sectional circular internal chamber 15, one portion of which opens onto the normally outer end of the body, as at 21, and the opposite end portion of which communicates with the internally screw threaded sleeve-like shank 14 (see Figures 5 and 6). At this point, the normally outer end of the coupling fitting body 13' is transversely slotted, as at 16, by milling, sawing, or like operation, thereby establishing communication and hence, permitting the introduction of the coupling head comprising the spherical head 17 and its shank 18 into said cross-sectionally circular chamber 15.

The above described method of producing the improved coupling fitting, obviously, is such as to effect a maximum saving in production time; moreover, to afford a fitting possessing exceedingly rugged and durable characteristics. The manner in which the slot or way 16 is formed in the normally outer end of the fitting, obviously, represents a material saving of time, labor and expense in so preparing said fitting that its cross-sectionally circular chamber 15 has common communication with one side and the normally outer end of the fitting; the latter, however, being of limited character by reason of the width of said slot 16 so that the shank 18 of the spherical head 17 will be permitted of but a relatively limited movement in certain directions, though greater movement in directions opposite thereto.

Additionally, said slot 16, by reason of its formation, obviously permits of convenient and ready introduction of the spherical head 17 of the coupling element into the cross-sectionally circular chamber 15 of the coupling fitting and too, as convenient and ready removal of this element therefrom, when such is desired.

Manifestly, the construction shown is capable of further modification, and such modification as is within the scope of my claims, I consider within the spirit of my invention.

I claim:

1. In a control device, a coupling body, the normally outer end portion thereof having a transversely disposed cross-sectionally circular chamber therein opening onto one of its sides and onto its normally outer end, the remaining portion of said body having a longitudinally disposed screw threaded way formed therethrough opening, at one end, onto the adjacent side of said chamber, the diameter of said way being less than the width of the chamber, a rod having a screw threaded end portion engaged in said screw threaded way and engageable, at times, in said chamber, the inner end of said rod having a recess therein and a shank carrying spherical head rotatably received in said chamber engageable in the recess in the inner end of said rod whereby to prevent its lateral displacement from the chamber and having its shank normally engaged through the open outer end of said body portion.

2. In a control device, a coupling body, the normally outer end portion of said body having a transversely disposed cross-sectionally circular chamber therein opening laterally onto one of its sides, the remaining portion of said body having a longitudinally disposed screw threaded way, of a diameter less than the width of the chamber, formed therethrough opening at one end onto the adjacent side of the chamber intermediately of its opposite ends, the outer end of said body having a transversely disposed way formed therein communicating with the adjacent and outer side of said chamber and with its open lateral side portion, a rod having a screw threaded end portion and a recessed inner end engaged in the screw threaded way and engageable, at times, in said chamber, and a shank carrying spherical head rotatably received in said chamber engageable in the recessed inner end of said rod whereby to prevent its lateral displacement from the chamber and having its shank normally engaged through the open outer end of said body portion.

3. In a control device, a coupling body, the normally outer portion thereof having a transversely disposed chamber therein opening onto one of its sides and onto its normally outer end, the remaining portion of said body having a longitudinally disposed way formed therethrough opening at one end, onto the adjacent side of said chamber, the diameter of said way being less than the depth of said chamber, a rod having an end portion engaged in and longitudinally adjustable to different positions in said way and engageable, at times, in said chamber, the inner end of said rod having a recess therein, and a shank carrying element pivotally received in said chamber and engageable in the recess in the inner end of said rod whereby to prevent its lateral displacement from the chamber and having its shank normally engaged through the open outer end of said body portion.

4. In a control device, a coupling body, the normally outer portion thereof having a transversely disposed chamber therein opening onto one of its sides and onto its normally outer end, the remaining portion of said body having a longitudinally disposed way formed therethrough opening, at one end, onto the adjacent side of said chamber, the diameter of said way being less than the depth of said chamber, a rod having an end portion engaged in and longitudinally adjustable to different positions in said way and engageable, at times, in said chamber, retaining means on the inner end of said rod, and a shank carrying element pivotally received in said chamber, engageable in said retaining means whereby to prevent its lateral displacement from the chamber, and having its shank normally engaged through the open outer end of said body portion.

ROBERT SHIPLEY.